(12) United States Patent
Berger et al.

(10) Patent No.: US 9,395,882 B2
(45) Date of Patent: Jul. 19, 2016

(54) SYSTEMS AND METHODS FOR PROMOTING RELATED LISTS

(75) Inventors: Marni A. Berger, Belmont, CA (US); Pratima Arora, Sunnyvale, CA (US); Anshu Agarwal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 464 days.

(21) Appl. No.: 13/594,618

(22) Filed: Aug. 24, 2012

(65) Prior Publication Data
US 2013/0227461 A1   Aug. 29, 2013

Related U.S. Application Data

(60) Provisional application No. 61/526,746, filed on Aug. 24, 2011.

(51) Int. Cl.
*G06F 3/048*   (2013.01)
*G06F 3/0482*   (2013.01)

(52) U.S. Cl.
CPC .................................. *G06F 3/0482* (2013.01)

(58) Field of Classification Search
CPC .................................................... G06F 3/0482
USPC ................................................. 715/777, 853
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |

(Continued)

OTHER PUBLICATIONS

Dynamic and Multiple Categories for Search Results by IBM, May 11, 2007, IP.com No. IPCOM000152780D.*

(Continued)

*Primary Examiner* — Peiyong Weng
(74) *Attorney, Agent, or Firm* — Dergosits & Noah LLP; Todd A. Noah

(57) ABSTRACT

A tab bar for a selected record includes a first tab and a second tab. The first tab links to a first category. The second tab links to a listing of other categories including a second category. Usage of the first and second categories is monitored and analyzed. If usage of the second category is greater than usage of the first category, the first tab is replaced with a third tab that links to the second category, thereby allowing direct access to what may be the more relevant second category.

13 Claims, 16 Drawing Sheets

(56) References Cited

U.S. PATENT DOCUMENTS

| | | |
|---|---|---|
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120662 A1* | 6/2003 | Vishik ............ 707/100 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2011/0035397 A1* | 2/2011 | Joshi et al. ............ 707/759 |
| 2011/0197124 A1* | 8/2011 | Garaventa ............ 715/234 |

OTHER PUBLICATIONS

Tab Presentation Policy based on Tab Relevance Analysis by IBM, Jun. 23, 2009, IP.com No. IPCOM000184397D.*

Method and System for Automatically Categorizing Multimedia Content Based on Timestamp by Disclosed Anonymously, May 26, 2011, IP.com No. IPCOM000207347D.*

Saba, "Saba Announces Revolutionary Social Enterprise Platform," Press Release, Mar. 20, 2012, pp. 1-4, Redwood Shores, California.

* cited by examiner

SYSTEMS AND METHODS FOR PROMOTING RELATED LISTS

CLAIM OF PRIORITY

This application claims the benefit of U.S. Provisional Patent Application 61/526,746, entitled SYSTEMS AND METHODS FOR PROMOTING RELATED LISTS, by Marni A. Gasn and Pratima Arora, filed Aug. 24, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to making relevant information easier to access in an on-demand services environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The age of information is upon us. Never before in the history of mankind has there been so much information so readily available. Networked computers have enabled organizations to collect and link vast amounts of information. The information can include data on customers, competitors, products, sales opportunities, employees, partners, issues, meetings, and much more. People can spend a good portion of the day wading and clicking through pages and pages of a website in order find what they are looking for. In some cases, the desired information may be buried deep within the website or application.

This can be very inefficient and frustrating especially when the user frequently accesses the information. People have differing information needs. For example, the information a salesperson may want to immediately access may be different from the information an account manager may want to immediately access. The information one wishes to immediately access may vary depending upon the context. Crowding the screen with information is not an adequate solution because it makes it difficult to identify the desired piece of information. Dividing the information onto various subpages or sublevels is not an adequate solution because while some users will have easy access to information, others will not. Rather, these users will have to drill deep into the application to retrieve the desired information.

Therefore, there is a need for improved systems and techniques for facilitating access to relevant information.

BRIEF SUMMARY

In an embodiment, a tab bar for a selected record includes a first tab and a second tab. The first tab links to a first category. The second tab links to a listing of other categories including a second category. Usage of the first and second categories is monitored and analyzed. If usage of the second category is greater than usage of the first category, the first tab is replaced with a third tab that links to the second category, thereby allowing direct access to what may be the more relevant second category.

In an embodiment, disclosed herein is a system and method for an improved touchscreen interface. iOS devices, such as the Apple iPhone® and Apple iPad® are examples of devices having a touchscreen interface; however, while iOS devices are referenced herein, a person having ordinary skill in the art will appreciate that other devices may incorporate one or more embodiments of this disclosure. In addition, one or more examples disclosed herein reference interfacing a Salesforce® CRM application on a touchscreen device; however, other applications may also use one or more of embodiments of this disclosure.

Users can have a large number of related lists on an entity. However, the screen dimension constraints of most mobile devices limit the number of viewable lists. As such, some or all related lists may be "hidden" from view. However, the viewable lists may not coincide with the lists that a user wishes to view. In an embodiment, the CRM application can be configured to display at least two related lists. In an embodiment, the displayed lists may be dynamically chosen. As a result, the most accessed related lists would be promoted from the "more" menu item into the entity's main menu. One or more embodiments disclosed herein may be illustrated in the attached screenshots.

In a specific implementation, a method includes displaying, on a mobile device, one or more related lists, the one or more related lists selected based upon a number of times the one or more related lists are accessed.

In a specific implementation, a method includes displaying a tab bar for a selected record. The tab bar includes a tab, and a set of dynamic tabs. The tab links to a list of demoted categories of second records related to the selected record, and each dynamic tab links to a promoted category of the second records. The method further includes monitoring usage of a demoted category, monitoring usage of a promoted category, and if the usage of the demoted category is greater than the usage of the promoted category, replacing a dynamic tab in the tab bar linking to the promoted category with another dynamic tab linking to the demoted category, the demoted category thereby being promoted to the tab bar.

The usage of the demoted category may include a number of times the demoted category was accessed during a rolling time period, and the usage of the promoted category may include a number of times the promoted category was accessed during the rolling time period. The usage of the demoted category may instead or additionally include a timestamp indicating when the demoted category was last accessed, and the usage of the promoted category may instead or additionally include a timestamp indicating when the promoted category was last accessed.

In a specific implementation, the usage of the demoted category includes a first timestamp indicating when the demoted category was last accessed, and a first value indicating a number of times the demoted category was accessed during a rolling time period, and the usage of the promoted category includes a second timestamp indicating when the promoted category was last accessed, and a second value indicating a number of times the promoted category was accessed during the rolling time period. In a specific implementation, displaying the tab bar includes displaying the tab bar on an electronic touchscreen of a portable electronic device.

In another specific implementation, a method includes storing a primary record, storing a set of secondary records that are organized into a set of categories, each category being associated with the primary record. The method further includes collecting first usage data of a first category that is accessed from a first graphical interface, collecting second usage data of a second category that is accessed from a second graphical interface, analyzing the first and second usage data, and if the analysis indicates the first category is more relevant than the second category, swapping the first category with the second category so that after the swap the second category is accessed from the first graphical interface and the first category is accessed from the second graphical interface, where the second graphical interface is at a level in a hierarchy that is below a level of the first graphical interface.

Before the swapping, a number of user actions to access the second category may be greater than a number of user actions to access the first category, and after the swapping, the number of user actions to access the second category may be less than the number of user actions to access the first category.

The analyzing the first usage information and the second usage information may include obtaining a first timestamp indicating when the first category was last accessed, and obtaining a second timestamp indicating when the second category was last accessed, where the first timestamp being more recent than the second timestamp indicates the first category is more relevant than the second category, and where the second timestamp being more recent than the first timestamp indicates the second category is more relevant than the first category.

The analyzing the first usage information and the second usage information may include determining a first value indicating a number of times the first category was accessed during a rolling time period, and determining a second value indicating a number of times the second category was accessed during the rolling time period, where the first value being greater than the second value indicates the first category is more relevant than the second category, and where the second value being greater than the first value indicates the second category is more relevant than the first category.

The analyzing the first usage information and the second usage information may include comparing a first timestamp indicating when the first category was last accessed with a second timestamp indicating when the second category was last accessed, and comparing a first value indicating a number of times the first category was accessed during a rolling time period with a second value indicating a number of times the second category was accessed during the rolling time period, where the first timestamp being more recent than the second timestamp indicates the first category is more relevant than the second category, the second timestamp being more recent than the first timestamp indicates the second category is more relevant than the first category, the first value being greater than the second value indicates the first category is more relevant than the second category, and the second value being greater than the first value indicates the second category is more relevant than the first category.

While one or more implementations and techniques are described with reference to an embodiment in which systems and methods for promoting related lists are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided for promoting related lists. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 1:
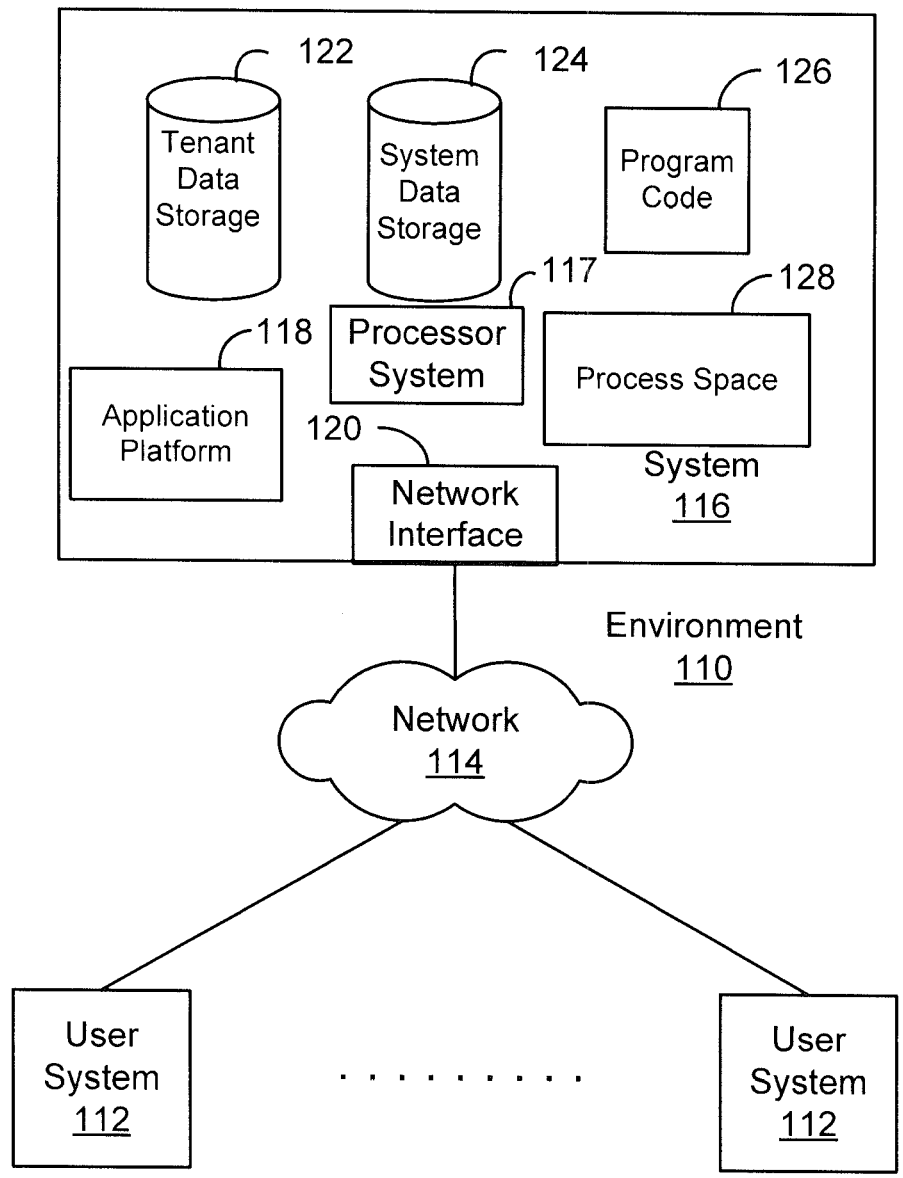
FIG. 1 illustrates a block diagram of an example of an environment wherein an on-demand database service implementing an embodiment: of promoting related lists might be used.

FIG. 1 illustrates a block diagram of an environment 110 wherein an on-demand database service implementing an embodiment of a system and method for promoting related lists might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer)

applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Google's Chrome browser, Mozilla's Firefox browser, Apple's Safari browser, Netscape's Navigator browser, Opera's browser, or a WAP-enabled browser in the case of a cell phone, smartphone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Oracle America, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
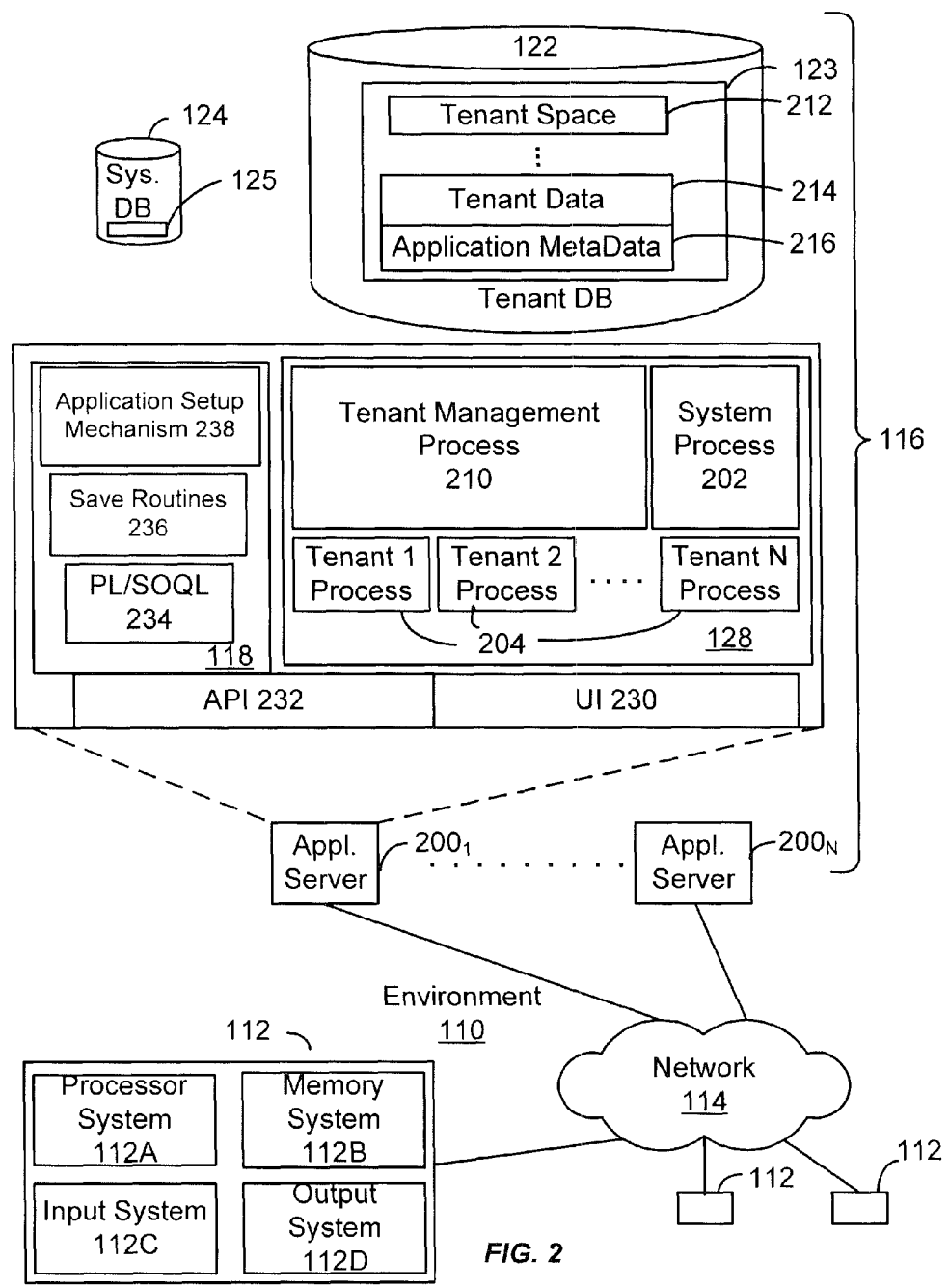
FIG. 2 illustrates a block diagram of an embodiment of elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 34 that provides a programming language style interface extension to API 232. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3:
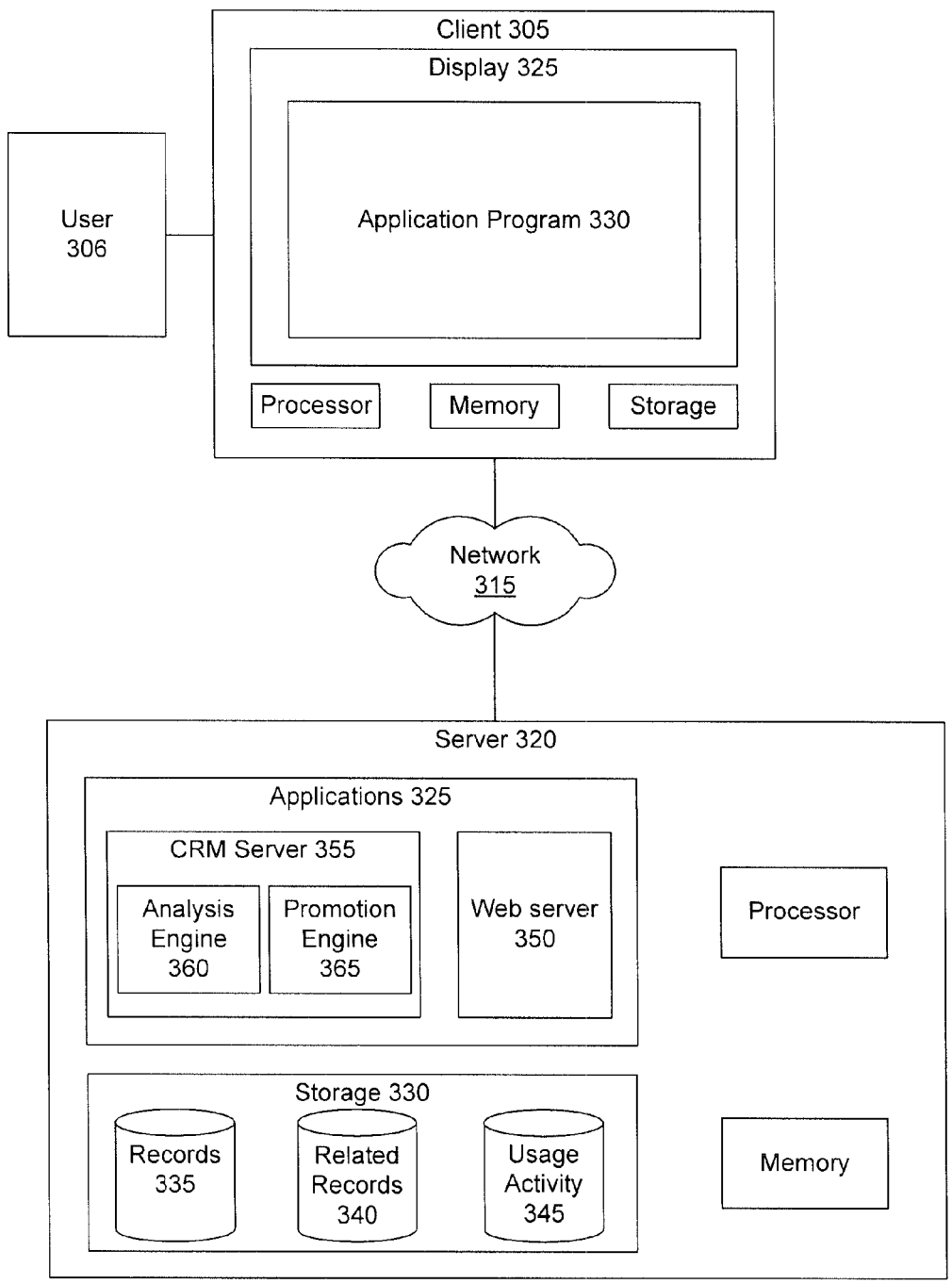
FIG. 3 illustrates a representative system for promoting related lists in an embodiment.

FIG. 3 shows a block diagram of a specific implementation of a system for promoting related lists. This system includes any number of clients and users such as a client 305 and a user 306 at the client. The clients access over a network 315 a server 320. The network is as shown in FIGS. 1-2 and described above.

The client is a general purpose computer with hardware and software such as shown by user systems 112 in FIGS. 1-2 and described above. For example, client 305 includes a display 325, an application program 330, processor, memory, and storage.

The amount of information that can be shown on the display is often limited by the size or area of the display. The problem of limited screen real estate is especially acute when the client device is a portable or hand-held device (e.g., tablet computer or smartphone). Information may be collapsed under various headings, subheadings, sub-subheadings, and so forth. Information that is heavily used, but is buried deep within the graphical user interface (GUI) presents significant usability issues because the user often must drill through multiple levels of the interface in order to access the information. As discussed in further detail below, in a specific implementation, a feature of the invention analyzes information usage and, based on the analysis, promotes heavily used or relevant information to an upper-level interface. Information that is less heavily used or less relevant is demoted to a lower-level interface in order to make room on the upper-level interface for the information that is more relevant. This improves the user experience because it provides the user with quicker and easier access to relevant information while removing or hiding less relevant information from the main interface.

In a specific embodiment, the client is a portable electronic device (e.g., tablet computer, or smartphone) having a touch-sensitive display or touchscreen. A touchscreen is an electronic visual display or screen that can detect the presence and location of a touch within the display area. For example, a user may provide input by touching (e.g., tapping, gesturing, or swiping) the display of the device with a finger or hand. Touchscreens can also sense other passive objects, such as a stylus. Some specific examples of portable electronic devices suitable for use with the present invention include the iPad® and iPhone® from Apple Inc., the Galaxy Tab from Samsung, and the HTC Desire and Nexus One® from HTC Corporation.

The application program can request, receive, and process data from a user, the server, or both. The data can be shown via the display. The application program can be a mobile browser program (e.g., Safari, Android browser, BlackBerry browser, or Internet Explorer Mobile), a mobile application or mobile app.

In a specific implementation, the mobile application is a native application. Typically, a native application is installed directly onto the client device and can be launched directly from a home page screen of the device such as by tapping on a launcher icon. The native application may be pre-installed on the client device during manufacture or may be downloaded by the user from various mobile software distribution platforms (e.g., AppExchange™ from salesforce.com, Apple App Store, Amazon Appstore, Google play, and others). A native application may be built using the device's native programming language (e.g., Java for Android by Google, Objective-C for iOS by Apple, or Visual C++ for Windows Mobile by Microsoft). A native application can be run as a standalone application (e.g., without the browser).

In another specific implementation, the mobile application is a web application or web app. A web application is typically accessed through the device's browser program. For example, a web application can be delivered over the hypertext transfer application protocol (HTTP) and can use server-side processing, client-side processing (e.g., JavaScript), or both to provide an application-like experience within a Web browser. More particularly, a web application may be written using HTML5, CSS3, JavaScript, server-side languages, a web application framework (e.g., PHP, Rails, or Python), or combinations of these.

In another specific implementation, the mobile application is a hybrid application. The hybrid application may be built using web technologies, but may be wrapped in a platform-specific shell that allows it to be installed like a native application.

The server includes components similar to the components shown in system 116 in FIGS. 1-2 and described above. For example, the server includes a processor, memory, applications 325, and storage 330. In a specific implementation, the storage includes first records (or data objects) 335, second records 340 that are related to or associated with the first records, and a usage activity database 345.

An application such as a Web server 350 can deliver pages (e.g., Web pages) and other data or content from the storage to application program 330. The pages may be rendered as panels to be shown on display 325. In a specific implementation, applications 325 include a customer relationship management (CRM) application or system 355 including an analysis engine 360 and a promotion engine 365. The CRM system can provide a platform to help employees of an organization collaborate, connect with customers, manage potential deals and opportunities, and provide responsive customer service. The CRM system can track business activity and other business information.

More particularly, in a specific implementation, the CRM system maintains a set of first or primary records stored in records database 335. The first records can include, for example, business accounts, opportunities, projects, and so forth. These are merely a few examples of the different types of records that the system can track and store. A first record can be related to one or more sets of second or secondary records that may be stored in database 340. The second records may be referred to as related lists.

An example of a first record includes an opportunity record or object. An opportunity can represent an organization's potential sale or deal. The opportunity may be associated with or include a related list of contacts, activities, products, services, deals, partners, and so forth. A related list of contacts may include the people who are involved on the opportunity such as a sales representative, technical sales representative, sales engineer, sales manager, inside sales representative, account manager, executive sponsor, and the like. A related list of activities may include meetings (e.g., upcoming sales pitches to the potential customer or client, or strategy meetings), tasks (e.g., prepare sales pitch presentation slides, research competitor products, collect datasheets and white papers to send to potential customer, or perform strengths, weaknesses, opportunities, and threats (SWOT) analysis).

A related list of products can include a listing of products that the customer is interested in purchasing. The products can include consumer goods, industrial goods, commercial goods, or agricultural goods (e.g., small electronics, computers, turbines, engines, cars, boats, planes, trucks, medical imaging equipment, medical products, or clothing—just to name a few examples). A related list of services can include services that the customer is interested in purchasing (e.g., warranty services, repair services, maintenance services, technical support, and the like). A related list of deals can include other related deals or opportunities. A deal may be related to the subject opportunity if some of the characteristics are the same or similar (e.g., same or similar customer, contract amount, products, salespersons, and the like). Providing similar deals can provide a template and other knowledge for closing the subject opportunity.

A related list of partners can include other organizations who are working on or who have a stake or interest in the opportunity (e.g., suppliers, joint venture partners, vendors, retailers, and the like). These are merely a few examples of the different categories of lists. There can be tens or even hundreds of different related list categories that may be associated with, for example, an opportunity or account. Further, the designation of primary record or object and a related list of secondary records or objects may be swapped depending on factors such as the context or desired query result. For example, a particular contact (e.g., "James Morgan") can be a primary record that is associated with a related list of secondary records or opportunities. The related list of opportunities can list the various opportunities that the contact James Morgan is working on.

User usage activity involving a related list is collected and stored in usage activity database 345. The analysis engine is responsible for analyzing the collected usage activity measure or determine how relevant or how heavily a particular related list is being used by the user. The promotion engine is responsible for promoting on a graphical user interface a heavily used or relevant related list category and demoting from the graphical user interface a less heavily used or relevant related list category. For example, the more relevant related list category may be made more prominent than the less relevant related list category. Making the more relevant related list category makes it easier for the user to quickly access the related list.

Figure 4:
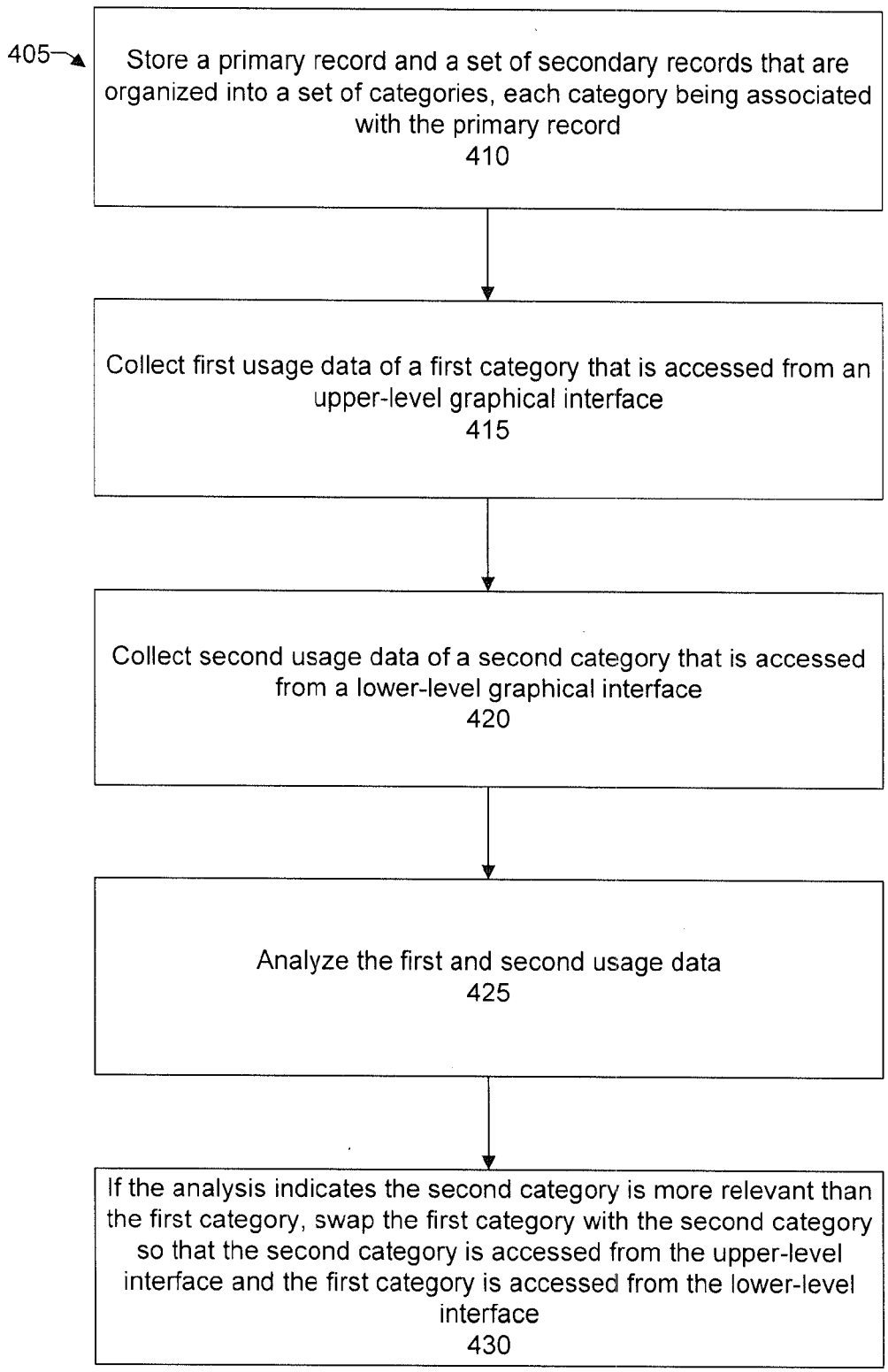
FIG. 4 is an operational flow diagram illustrating a high level overview of a technique for determining which related list to promote in an embodiment.

FIG. 4 shows an overall flow 405 for promoting related lists. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 410, the system stores a primary record and a set of secondary records. The secondary records are organized into a set of categories (e.g., related list categories). Each category is associated with the primary record. For example, as discussed above a primary record can represent an opportunity. The opportunity can have a related contacts category (e.g., people working on the opportunity), a related deals category (e.g., other deals or opportunities related to the opportunity), and so forth.

In a step 415, the system collects first usage data of a first category that is accessed from an upper-level (or first) graphical interface. In a step 420, the system collects second usage data of a second category that is accessed from a lower-level (or second) graphical interface, below the upper-level graphical interface. In a specific implementation, the upper and lower-level graphical interfaces represent different pages or Web pages of the application program. In this specific implementation, the lower-level graphical interface is at a hierarchical level that is below a hierarchical level of the upper-level graphical interface. In other words, the upper-level graphical interface is at a hierarchical level that is above a hierarchical level of the lower-level graphical interface. The upper-level interface may be referred to as a parent node, a main page, or home page. The lower-level graphical interface may be referred to as a child node or subpage.

More particularly, in this specific implementation, a number of user actions to select the second category (on the lower-level graphical interface) is greater than a number of user actions to select the first category (on the upper-level graphical interface). For example, from a home page of the primary record, the user may select the first category using a single action (e.g., a single tap on the first category). To select the second category, the user may have to navigate from the home page (e.g., upper-level page) to an intermediary page (e.g., lower-level page) and then select the second category. This can involve two actions (e.g., one tap to navigate from the home page to the intermediary page and another tap to select the second category).

In a specific implementation, the collected usage data includes frequency data and recentcy data. Frequency data refers to how often the category is accessed during a time period. In a specific implementation, the time period is a rolling time period. A rolling time period is a period of time that precedes a particular time such as the current time. For example, the rolling time period may be the last hour, last 8 hours, last day, last three days, last five business days, last five calendar days, last week, last two weeks, last month, last login session, and so forth. In an implementation, a duration of the rolling time period is configurable such as by an administrator of the system. The duration may be specified using any unit of time (e.g., hours, days, weeks, or months).

Recentcy data refers to the time the category was last accessed. For example, recentcy data may include a timestamp that marks the time and date that the category was last accessed. Accessing a category an include user actions such as a user selecting the category, clicking the category, or tapping on the category. The usage data may include frequency data and not recentcy data, or vice versa. The usage data may include a duration (e.g., how long did the user work within the category?, or how long did the page or window containing the category remain open or in focus?). The usage data is stored in usage activity database 345 (FIG. 3).

Table A below shows an example of an entry that may be stored in the usage activity database. A column "User" identifies the user. A column "Related List Category Accessed" identifies the related list that the user accessed. A column "Current Level on Interface" identifies whether the related list is currently on the upper-level interface or the lower-level interface. A column "Time and Date of Last Access" stores a timestamp indicating when the related list was last accessed. A column "Frequency of Access" stores a number of times the related list was accessed during a time or rolling time period (e.g., last week).

TABLE A

| User | Related List Category Accessed | Current Level on Interface | Time and Date of Last Access | Frequency of Access |
|---|---|---|---|---|
| Tyler Jones | Contacts | Upper-level | Oct. 7, 2010 | 0 |
| Tyler Jones | Related Deals | Lower-level | Nov. 16, 2010 | 10 |

According data stored in a first row in Table A above, user Tyler Jones last accessed a first related list category "Contacts" on Oct. 7, 2010, has accessed the "Contacts" category zero times within the last time period, and the "Contacts" category is currently accessed from the upper-level interface. According to a second row, Tyler Jones last accessed a second related list category "Related Deals" on Nov. 16, 2010, has accessed the "Related Deals" category ten times within the last time period, and the "Related Deals" category is currently accessed from the lower-level interface.

In a step 425, the system analyzes the first and second usage data to determine which of the first or second categories the user uses the most (or uses the least) or is most relevant (or is the least relevant). In a specific implementation, category use or relevancy is calculated or is measured as a function of time and date of last access and frequency of access. That is, a first factor in measuring category use or relevancy includes time and date of last access. A second factor in measuring category use or relevancy include frequency of access.

Figure 5:
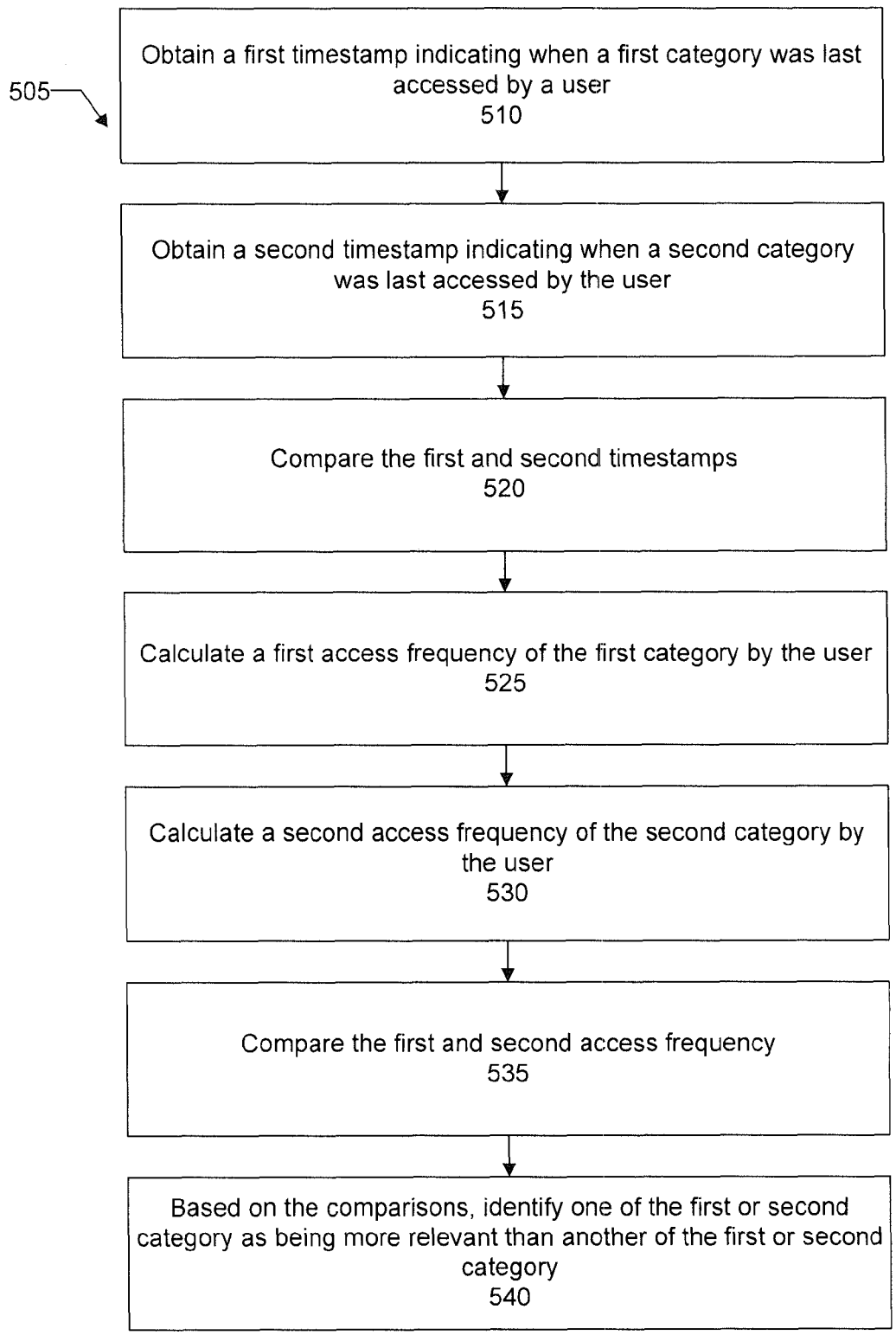
FIG. 5 illustrates a flow diagram of an algorithm to analyze a related list for promotion in an embodiment.

FIG. 5 shows a flow 505 for analyzing usage data. In a step 510, the system obtains a first timestamp indicating when a first category was last accessed by a user. In a step 515, the system obtains a second timestamp indicating when a second category was last accessed by the user.

In a step 520, the system compares the first and second timestamps. In this specific implementation, a first timestamp associated with a first category that is more recent than a second timestamp associated with a second category indicates that the first category is more relevant than the second category.

Conversely, the second timestamp being more recent than the first timestamp indicates that the second category is more relevant than the first category. In other words, a degree of use of the second category is greater than a degree of use than the first category. In the example shown in Table A above, the first category "Contacts" has a first timestamp or last access time and date of "Oct. 7, 2010." The second category "Related Deals" has a second timestamp or last access time and date of Nov. 16, 2010. Thus, the second category would be more relevant than the first category because the second timestamp is more recent than the first timestamp. In other words, the second category was accessed after the first category. The first category was accessed before the second category. A period of time between a current time and the second timestamp is less than a period of time between the current time and the first timestamp.

As discussed above, a second factor in measuring category use or relevancy includes frequency of access, i.e., a number of accesses during a time period. So, in a step 525, the system calculates a first access frequency of the first category by the user. In a step 530, the system calculates a second access frequency of the second category by the user. In a step 535, the system compares the first and second access frequencies. In this specific implementation, a first access frequency associated with a first category that is greater than a second access frequency associated with a second category indicates that the first category is more relevant than the second category.

Conversely, the second access frequency being greater than the first access frequency would indicate that the second category is more relevant than the first category. In the example shown in Table A above, the first category "Contacts" has a first access frequency of "0" or zero. The second category "Related Deals" has a second access frequency of "10" or ten. In other words, the user accessed the first category "Contacts" zero times within a time period (e.g., last week). And the user accessed the second category "Related Deals" ten times within the time period. In this example, the access frequency comparisons indicate that user Tyler Jones used the second category more than the first category because the second access frequency (e.g., "10") is greater than the first access frequency (e.g., "0").

In a step 540, based on the comparisons, the system identifies one of the first or second category as being more used by the user or more relevant to the user than another of the first or second category. In this example, the second category "Related Deals" would be identified as being more used or relevant than the first category "Contacts." As shown in Table A above, the second timestamp is more recent than the first timestamp and the second access frequency is greater than the first access frequency.

In a specific implementation, the system uses a scoring algorithm to score the relevancy or measure the degree of use or relevancy of the first and second categories. The scoring algorithm may assign a first weight to the first factor (e.g., time and date of last access) and a second weight to the second factor (e.g., access frequency). The weights may be configurable such as by an administrator. The first weight may be different from the second weight. For example, the administrator may make the first weight greater than the second weight to weight the first factor more heavily than the second factor. Alternatively, the administrator may make the second weight greater than the first weight to weight the second factor more heavily than the first factor.

Allowing an administrator to configure the weights allows an organization to adapt the system to what is appropriate for the organization. The access frequency factor takes into account how often a category is accessed in order to determine relevancy. However, past access frequency of a category is not necessarily always indicative of future relevancy of the category. For example, the opportunity may have moved into a different phase where that category may not be as relevant as it was during the previous opportunity phase. Thus, the time and date of last access can also be used as an indicator of relevancy.

Generally, it is desirable to present users with a fairly consistent graphical user interface so that users do not have to relearn a new interface each time they log into the system. It is also desirable to make relevant information easy to access. Allowing administrators to assign different weights to the access frequency and time and date of last access factors allows administrators to strike a balance between providing a consistent graphical interface and providing relevant information. Depending on the weights or bias assigned to the factors, a first category having a greater access frequency than a second category may not necessarily mean that the first category is more relevant because the last access time of the second category may be more or much more recent than the first category. Likewise, a first category having a more recent time of last access than a second category may not necessarily mean that the first category is more relevant because the access frequency of the second category may be greater or much greater than the access frequency of the first category.

Weighting is merely one example of a statistical technique to help predict which category would be relevant to a user. Other techniques that may instead or additionally be used include, for example, exponential decay (e.g., more recent access frequency may be weighted more heavily than less recent access frequency), regression analysis, analysis of variance, factor analysis, probability analysis, and others.

Referring now to FIG. 4, in a step 430, if the analysis indicates greater use or relevancy of the second category than the first category, the system swaps the first category with the second category. In the example shown in Table A above and according to the analysis algorithm shown in FIG. 5, there is greater use of the second category than the first category. Thus, in this specific implementation, the system swaps the first and second categories. After the swap, the second category will be accessed from the upper-level graphical interface and the first category will be accessed from the lower-level graphical interface. The result or effect of the swap can be reducing a number of user actions (e.g., clicks or taps) required to access the second category. This helps to improve usability and efficiency because the more heavily used or more relevant category (e.g., second category) can now be more easily accessed.

Figure 6:
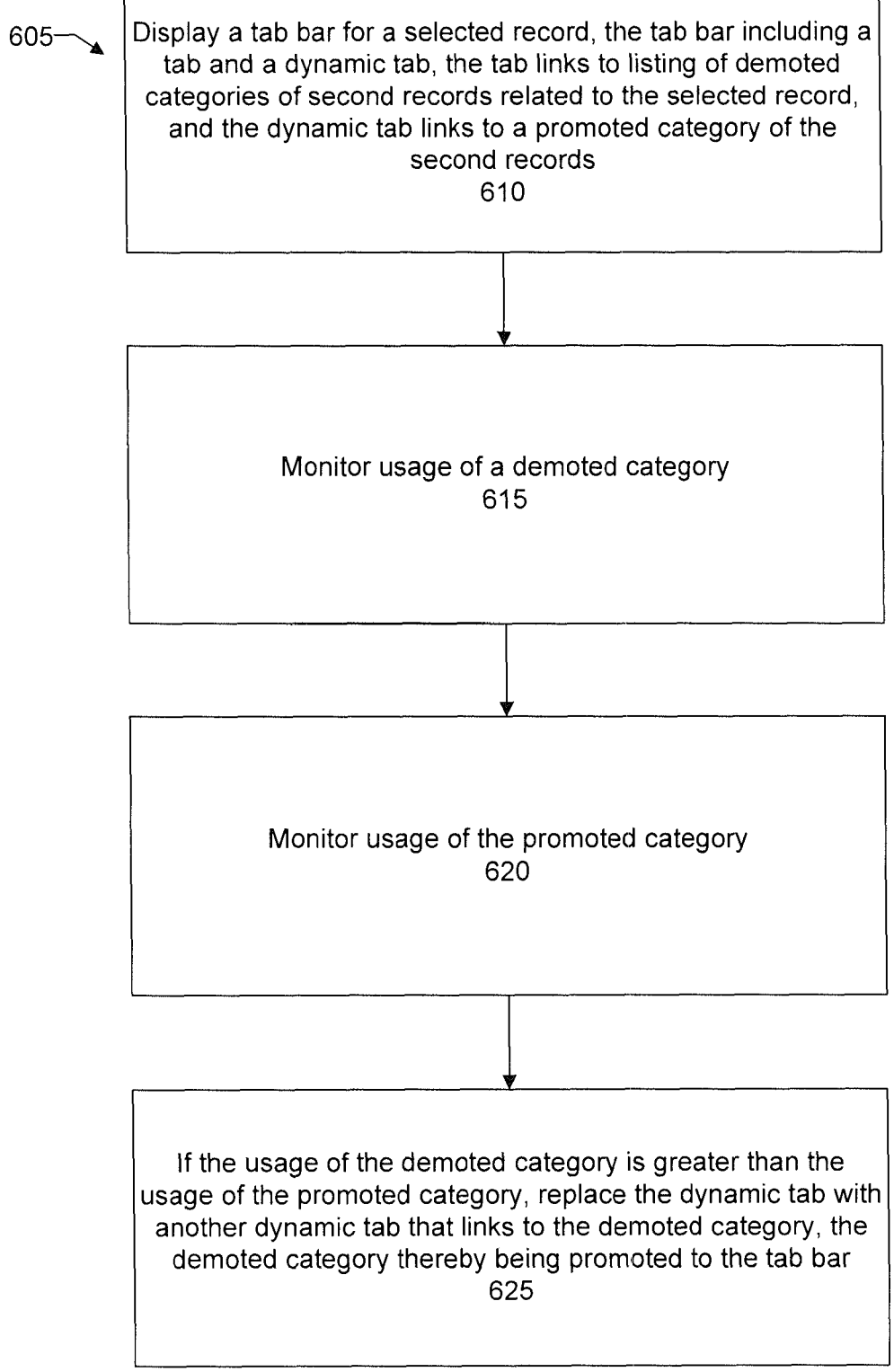
FIG. 6 illustrates a flow diagram for making a relevant related list easy to access in an embodiment.

FIG. 6 shows an overflow 605 of a specific implementation for adjusting a user interface so that a more relevant category is more easily accessed than a less relevant category. In a step 610, the system displays on an electronic screen a tab bar for a selected record. The tab bar includes at least one tab, and at least one dynamic tab. The tab links to (e.g., references, or represents) a listing of demoted categories of second records related to the selected record. The dynamic tab links to a promoted category of the second records related to the selected record.

A user can access the promoted category directly by selecting the dynamic tab. The user can access the demoted category by selecting the tab which brings up a page that lists the demoted categories. The user can then access the desired demoted category by selecting the demoted category from the demoted category listing page.

In steps 615 and 620, the system monitors usage of a demoted category and usage of the promoted category. For example, the system may maintain counter variables that track a number of times the promoted category is accessed during a time period and a number of times the demoted category is accessed during the time period. The system may provide variables that store timestamps indicating when the promoted and demoted categories were last accessed.

In a step 625, if the usage of the demoted category is greater than the usage of the promoted category, the system replaces the dynamic tab in the tab bar that links to the promoted category with a dynamic tab that links to the demoted category, the demoted category thereby being promoted to the tab bar. The former demoted category has now been promoted. The formerly promoted category has now been demoted. The former promoted category, rather than being accessed from the dynamic tab, is now accessed from the listing of demoted categories page.

FIGS. 7-16 show some screenshots of pages displayed on electronic screen of a client to a user. The pages are from an application program provided by salesforce.com of San Francisco, Calif. It should be appreciated that these screenshots and the accompanying description are provided merely as a sample implementation. It should be understood that the invention is not limited to the specific examples and features presented. Aspects (e.g., screens, pages, or web pages) of the invention may be modified or altered as appropriate for a particular application, industry, business, or use. The application program is not limited to the specific graphical user interface (GUI) controls, widgets, objects, elements, containers, icons, windows, views, navigation, help text, and layouts shown in the screenshots. Various specific implementations may include GUI elements such as floating windows, modal windows, palette or utility windows, pop-up boxes, dialog boxes, frames, list boxes, radio buttons, check boxes, context menus, sliders, spinners, menu bars, combo boxes, scroll bars, tabs, tree views, grid views, tooltips, balloon help, infobars, links, buttons, icons, and the like.

Figure 7:
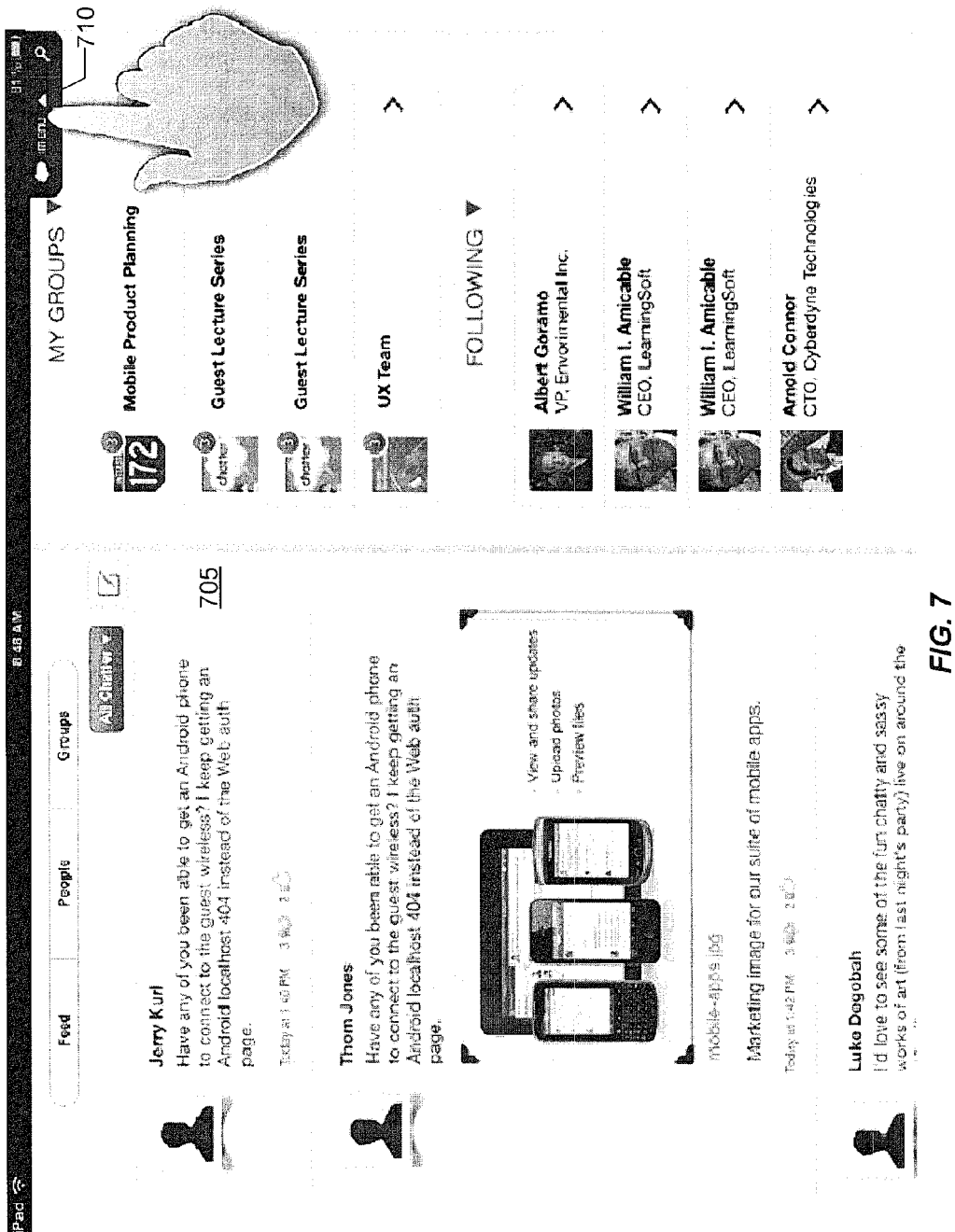
FIG. 7 illustrates a screenshot of a customer relationship management (CRM) application in an embodiment.
Figure 8:
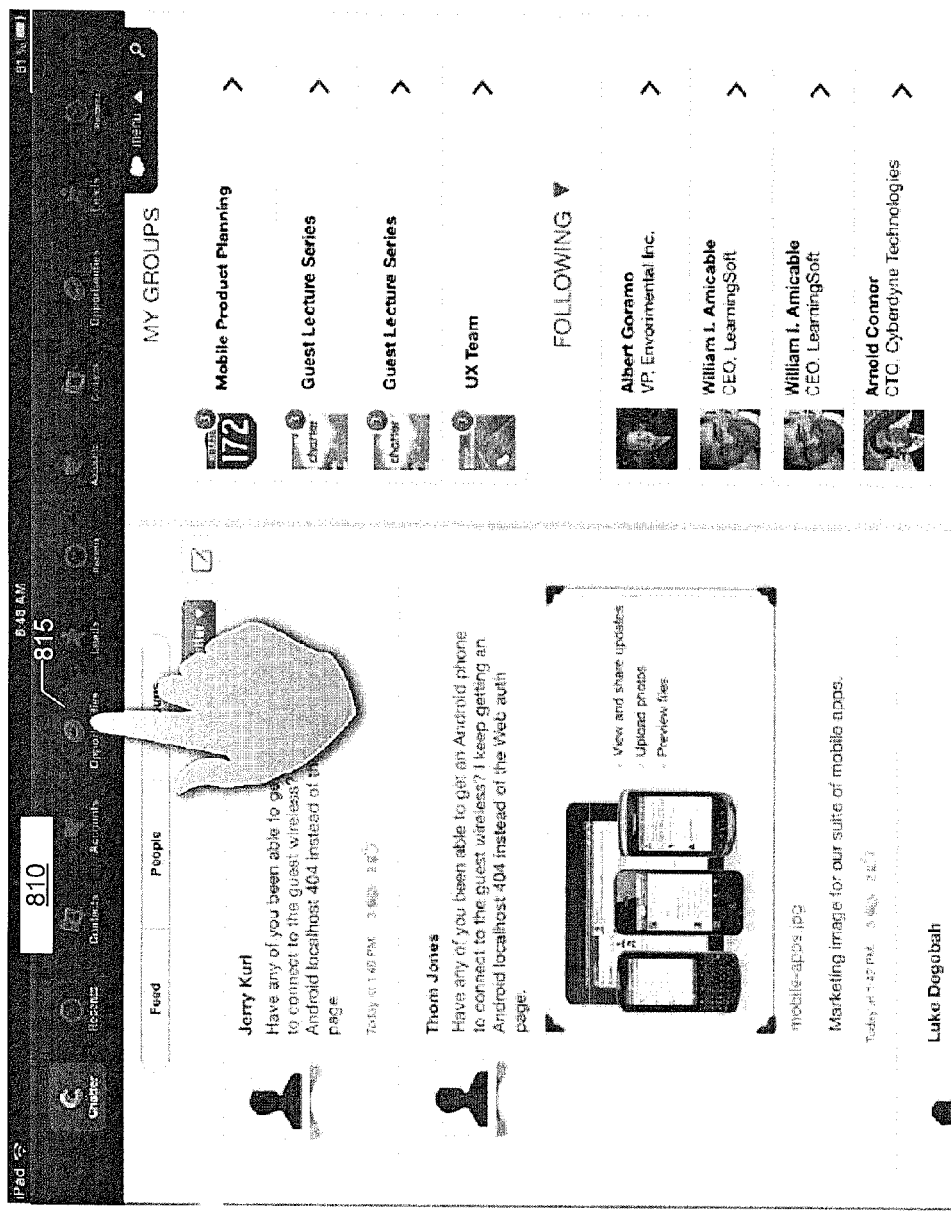
FIG. 8 illustrates another screenshot of the customer relationship management (CRM) application in an embodiment.

FIG. 7 shows a home page 705 of an application program having a feature to promote a related list. The page may be shown to the user after the user has successfully logged in (e.g., provided the correct username and password). The home page includes a menu link 710 that can be selected to show menu options 810 (FIG. 8). As shown in FIG. 8, the user can select an opportunities icon 815 to view the opportunity records.

Figure 9:
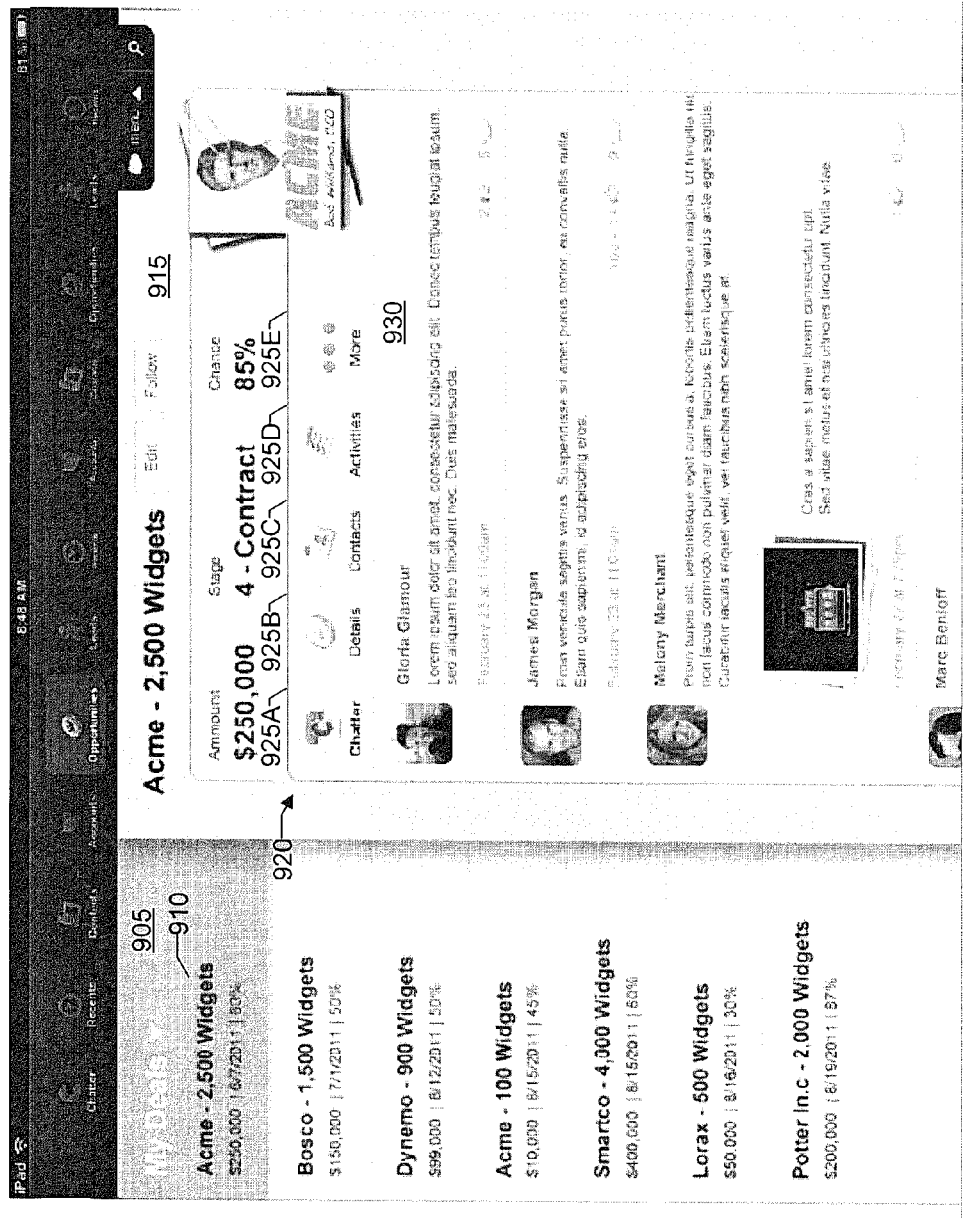
FIG. 9 illustrates another screenshot of the customer relationship management (CRM) application showing a tab bar of related lists for a selected record in an embodiment.

FIG. 9 shows a list 905 of opportunity records that the user is authorized to access. In this example, the user has selected an opportunity record 910. A page 915 displays a brief overview of the selected opportunity record. Page 915 may be referred to as a main or home page of the opportunity record. The page includes a name of the opportunity (e.g., "Acme—2,500 Widgets"), an amount of the opportunity (e.g., "$250,000"), the opportunity stage (e.g., "Stage 4—Contract"), and a chance or probability of success (e.g., "85 percent").

The page includes a tab bar 920. The tab bar includes a set of tabs including a first tab 925A labeled "Chatter," a second tab 925B labeled "Details," a third tab 925C labeled "Contacts," a fourth tab 925D labeled "Activities," and a fifth tab 925E labeled "More." This tab bar includes five tabs. A tab bar, however, can include any number of tabs. In a specific implementation, the application program is adapted for a portable or hand-held electronic device having a touchscreen display. On a touchscreen display, a user can provide input or make a selection by touching (e.g., tapping) a surface of the display with their finger. Thus, it is desirable to present the user with a sufficiently large tap target that allows the user to make the intended selection. In this specific implementation, the number of tabs on a tab bar can range from about 2 to about 15, including, for example, 3, 4, 5, 6, 7, 8, 9, 10, 11, 12, 13, 14, or more than 15, or less than 2. The number of tabs on a tab bar may be proportional to the size (e.g., length or width)

of the display screen. For example, a larger display may have a greater number of tabs than a smaller display.

The tabs can link to other pages of information related to the selected record. For example, selecting the first tab ("Chatter") shows a threaded discussion page 930 that includes messages exchanged among the various people involved in the opportunity. Selecting the second tab ("Details") shows a page including further details of the opportunity (e.g., opportunity owner, date that the opportunity was created, and so forth).

In a specific implementation, a tab represents a category of second records (or related lists) that are related to the selected record. That is, the second records or related lists are organized into various categories, such as "Contacts" (third tab 925C), or "Activities" (fourth tab 925D). For example, selecting the "Contacts" tab or category shows a page listing the people involved in the opportunity. Selecting the "Activities" tab or category shows a page listing the activities related to the opportunity.

Figure 10:
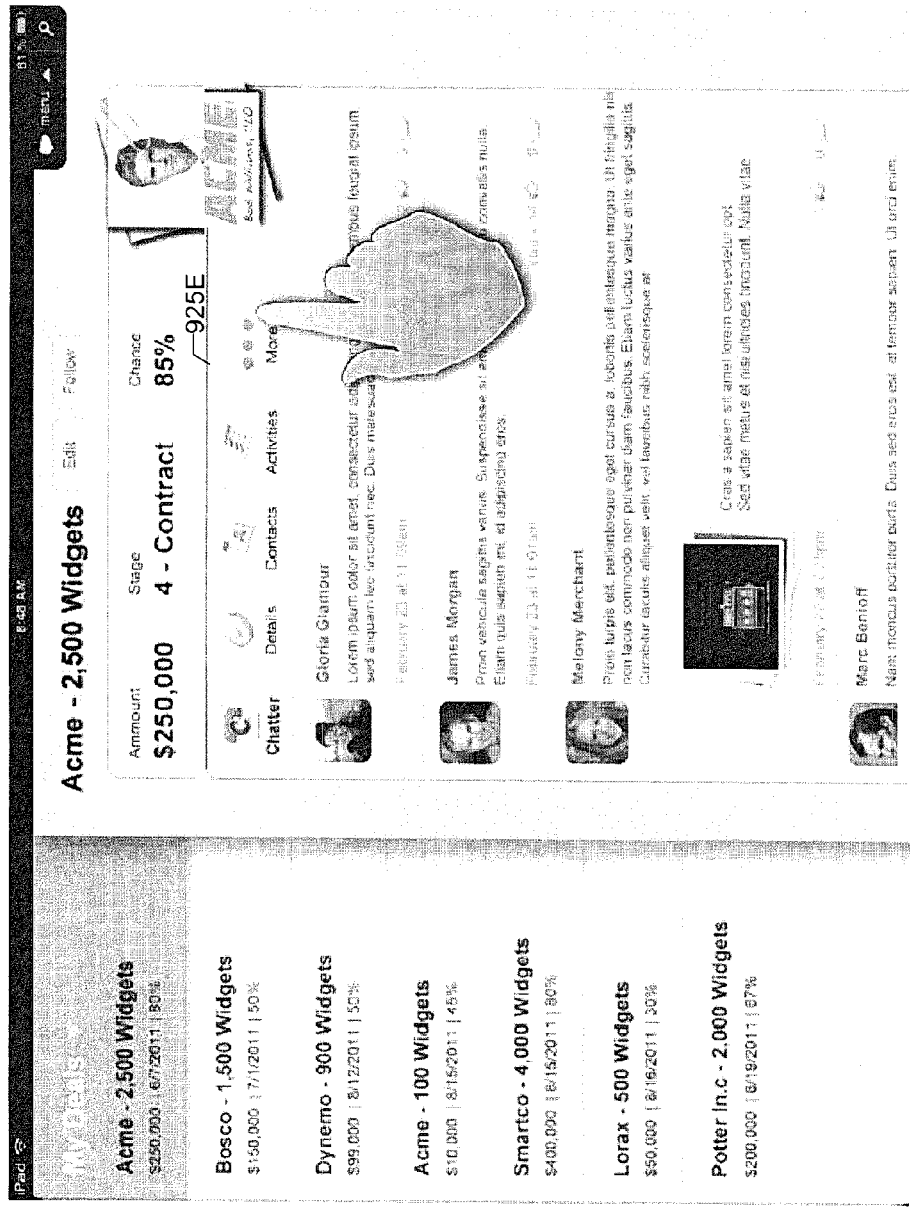
FIG. 10 illustrates another screenshot of the customer relationship management (CRM) application showing access to a listing of related lists in an embodiment.
Figure 11:
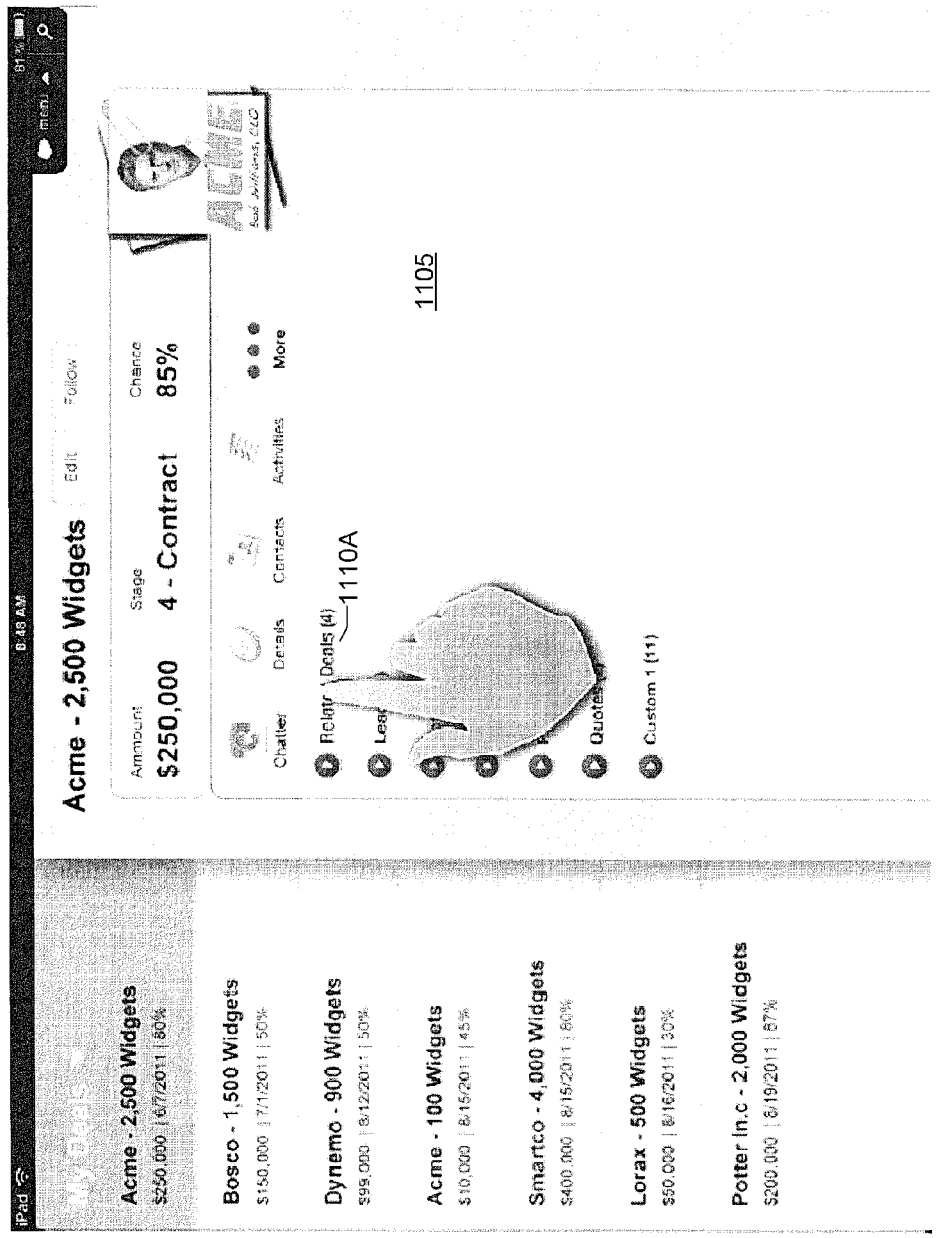
FIG. 11 illustrates another screenshot of the customer relationship management (CRM) application showing a page listing the related lists in an embodiment.
Figure 12:
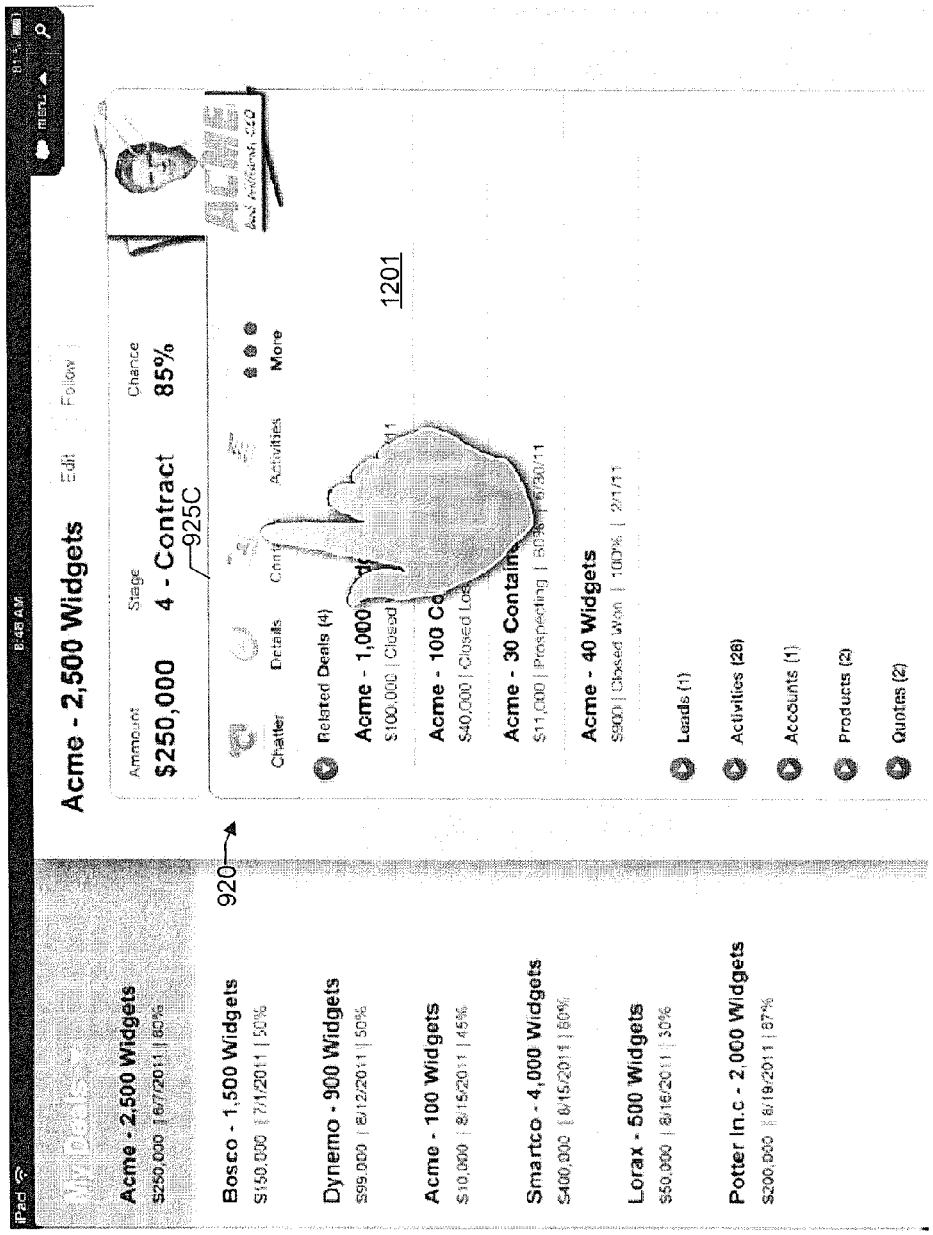
FIG. 12 illustrates another screenshot of the customer relationship management (CRM) application showing a contacts related list category being selected from the tab bar in an embodiment.
Figure 13:
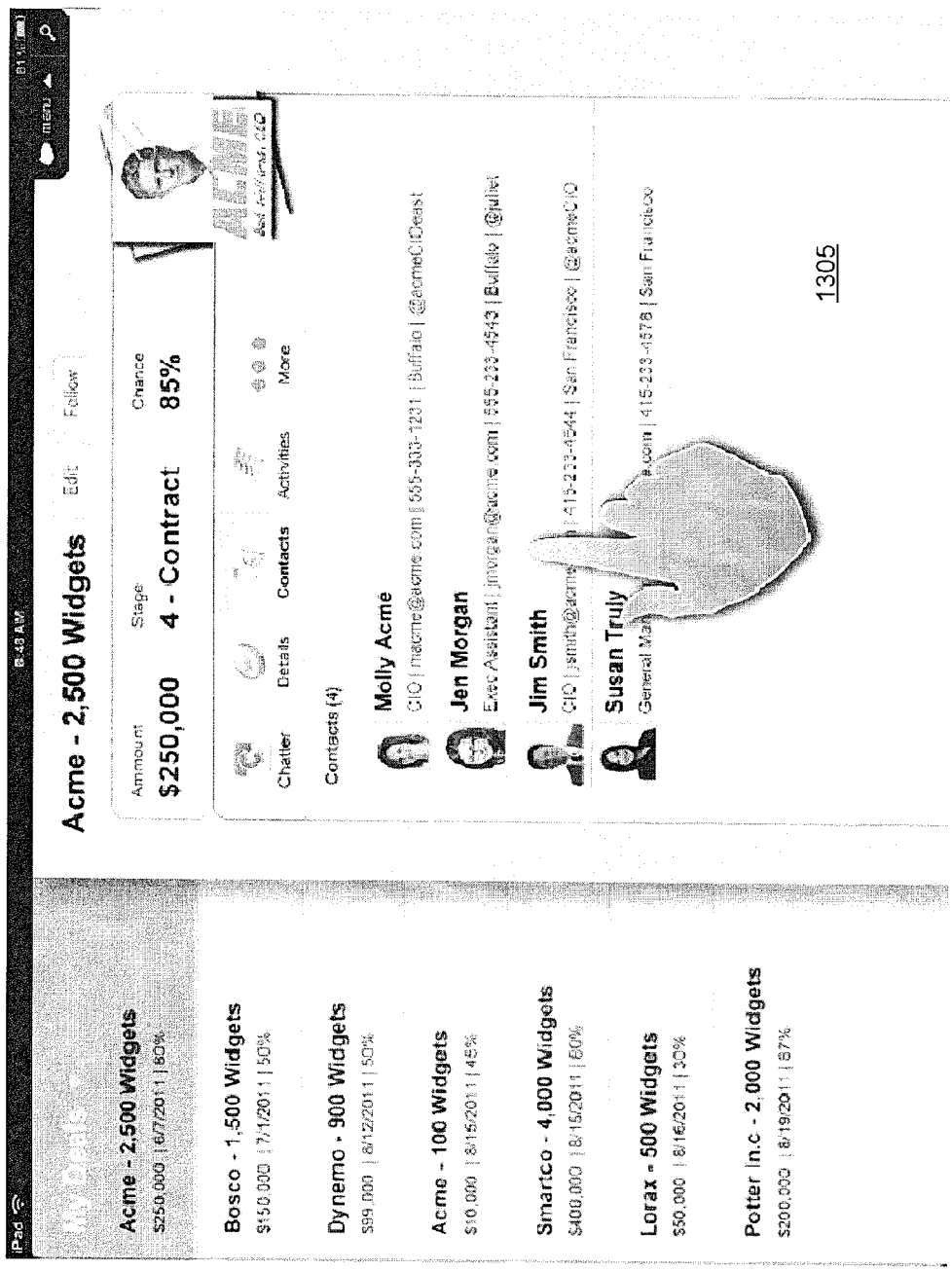
FIG. 13 illustrates another screenshot of the customer relationship management (CRM) application showing a page listing of contacts in an embodiment.
Figure 14:
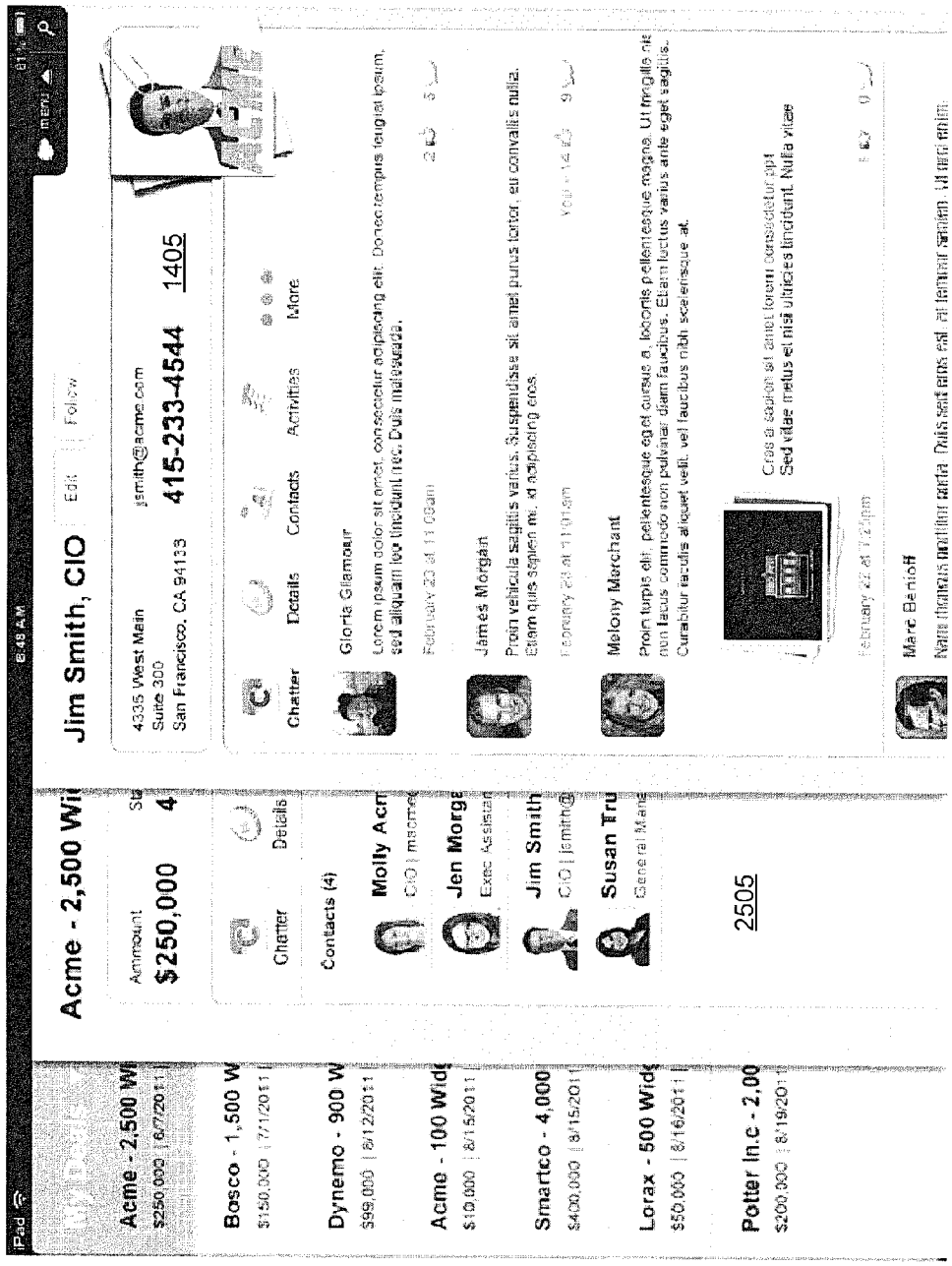
FIG. 14 illustrates another screenshot of the customer relationship management (CRM) application showing a profile page of a contact in an embodiment.

The number of categories that can be displayed in the tab bar is limited by the size of the display. So, as shown in FIG. 10, the "More" tab (fifth tab 925E) can be selected to show a page 1105 (FIG. 11) that lists the other categories of records (e.g., related lists) that are related to or associated with the opportunity. For example, there can be a category (or related list) labeled "Related Deals" 1110A, a category labeled "Leads," a category labeled "Products," a category labeled "Products," a category labeled "Quotes," and so forth. Organizations can create custom categories.

From page 1105, the user can review the list of related categories and select the desired category. For example, the user can select category 1110A ("Related Deals") to see a listing 1201 (FIG. 12) of deals that are related to the opportunity. Page 1105 may be referred to as an intermediary page.

Alternatively, the user can select a category directly from the tab bar. For example, the user can select tab 925C to see a listing 1305 of the people working on the opportunity. The user can select a contact (e.g., "Jim Smith") to see a profile page 1405 of the selected contact.

As discussed above, in a specific implementation, the system tracks the user's usage of the various categories. For example, the system can track the user's usage of the "Contacts" category (accessed from the tab bar) and the user's usage of the "Related Deals" category (accessed from the intermediary or category listing page 1105 (FIG. 11)). If, for example, the user's usage of the "Related Deals" category is greater than the user's usage of the "Contacts" category, the system can promote the "Related Deals" category to the tab bar and demote the "Contacts" category to the category listing page.

Figure 15:
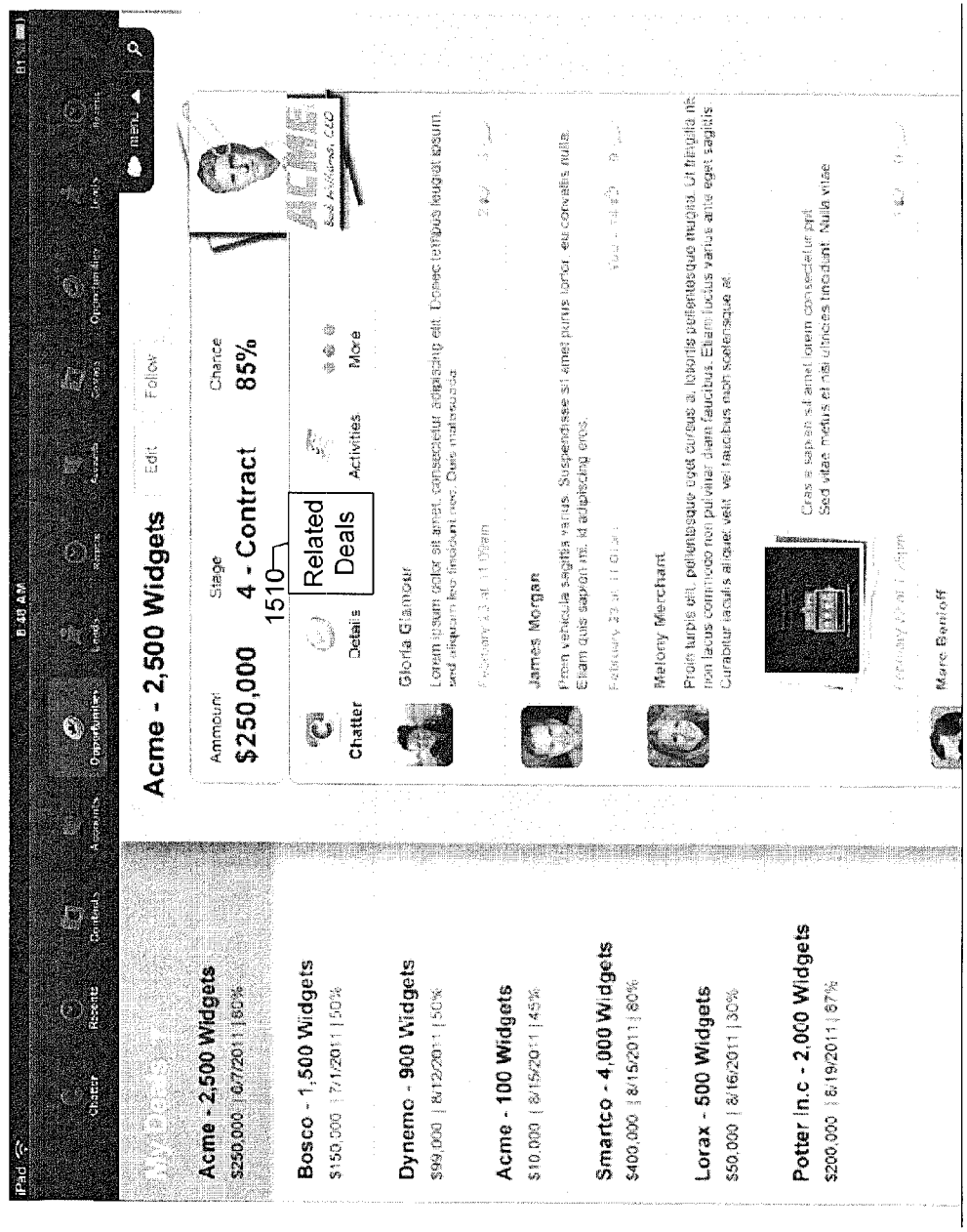
FIG. 15 illustrates another screenshot of the customer relationship management (CRM) application showing the contacts tab of the tab bar having been replaced with a related deals list category in an embodiment.
Figure 16:
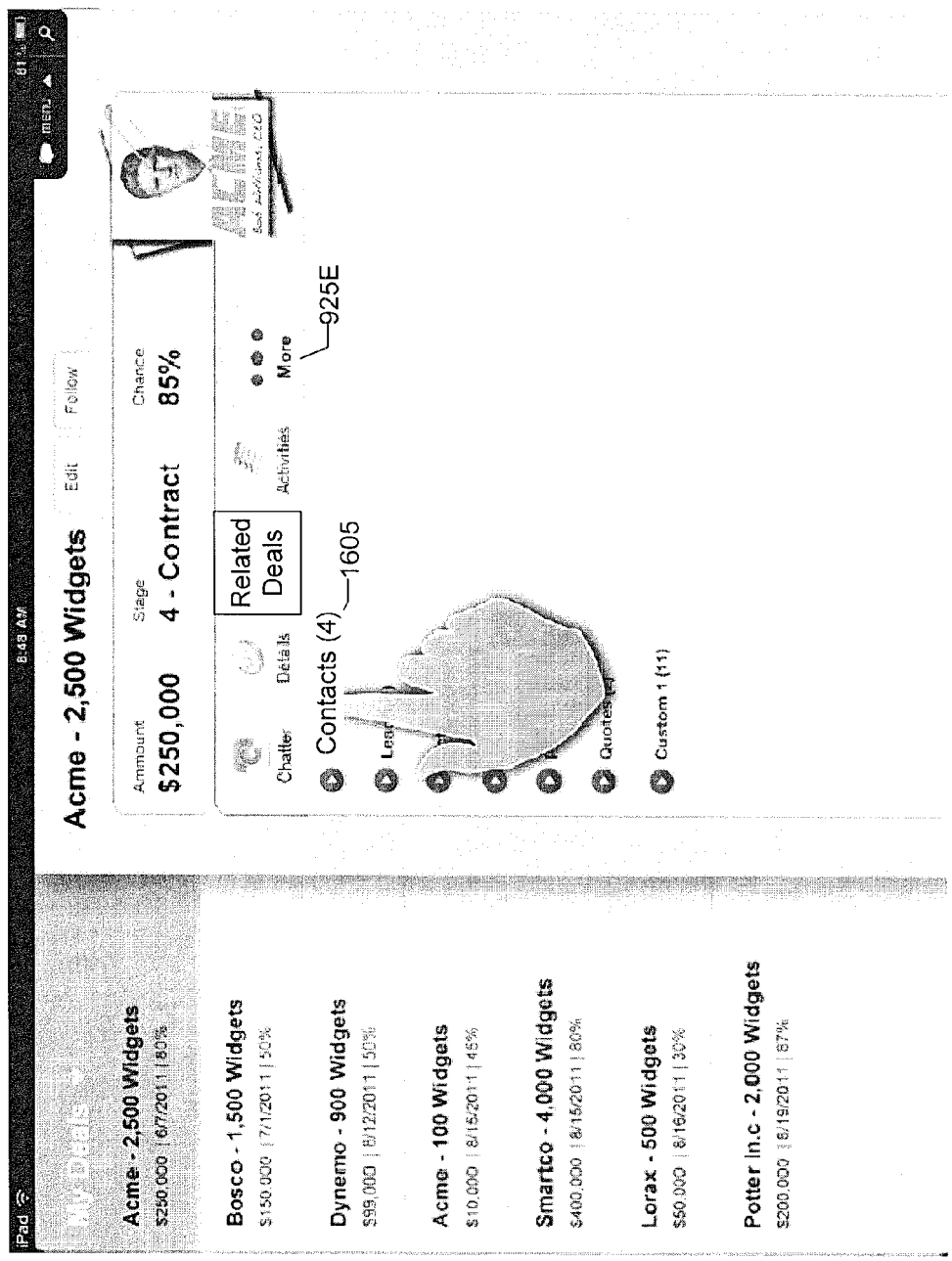
FIG. 16 illustrates another screenshot of the customer relationship management (CRM) application showing the contacts related list category having been demoted to the page listing the related lists in an embodiment.

For example, as shown in FIG. 15, third tab 925C (FIG. 9) from the tab bar has been replaced or swapped with a tab 1510 labeled "Related Deals." The user can access the listing of related deals by selecting tab 1510 instead of having to select tab 925E ("More") and then the "Related Deals" link from the intermediary category listing page 1105. In other words, the "Related Deals" category to be quickly accessed since pit can be accessed directly by clicking on the appropriate tab in the tab bar. As shown in FIG. 16, "Contacts" category 1605 or related list has been demoted from the tab bar to the category listing page under the "More" tab (i.e., fifth tab 925E).

Referring now to FIG. 9, third tab 925C may be referred to as a dynamic tab because it can change based on usage (e.g., compare FIG. 9 with FIG. 15). In a specific implementation, a tab bar includes two fixed tabs that do not change (e.g., first and second tabs 925A and 925B) and two dynamic tabs (e.g., third and fourth tabs 925C and 925D). Having a fixed tab helps to provide the user with a consistent user interface. In this specific implementation, the fixed tabs are on a left hand side of the dynamic tabs. Thus, when reading the tab bar from left to right, the user will initially be greeted with a consistent set of tabs that can help to orient the user. The fixed and dynamic tabs, however, can be positioned anywhere within the tab bar.

It should be appreciated that there can be other layouts of the tab bar other than what is shown in FIG. 9. In a specific implementation, a tab bar includes a first tab, a second tab, and a third tab. In this specific implementation, the first tab is a fixed tab, the second tab links directly to a related category, and the third tab links to a category listing page. In a specific implementation, the second tab is between the first and second tabs. In another specific implementation, the first tab is between the second and third tabs. In another specific implementation, the third tab is between the first and second tabs. The number of dynamic tabs may be greater than, less than, or equal to the number of fixed tabs.

In a specific implementation, a method includes displaying a tab bar for a selected record. The tab bar includes a tab, and a set of dynamic tabs. The tab links to a list of demoted categories of second records related to the selected record, and each dynamic tab links to a promoted category of the second records. The method includes monitoring usage of a demoted category of the second records related to the selected record. Monitoring usage of a promoted category of the second records related to the selected record, and if the usage of the demoted category is greater than the usage of the promoted category, replacing a dynamic tab in the tab bar linking to the promoted category with another dynamic tab linking to the demoted category, the demoted category thereby being promoted to the tab bar.

This patent application describes a technique to replace a less heavily used or relevant related list accessed from the tab bar with a more heavily used or relevant related list. This helps to make it easier for the user to access the more relevant related list by reducing the number of user actions to select the more relevant related list.

In other specific implementations, one or more other techniques are used to make selection of the more relevant related list easier. For example, in other specific implementations, a first icon or tap target linking to the more relevant related list may be made larger than a second icon or tap target linking to the less relevant related list. The first and second icons may be displayed on the same page, but may have different sizes. Visual techniques such as highlighting, animation, and so forth may instead or additionally be used to make the first icon more prominent than the second icon. The first icon may be relocated to a more prominent location on the page than the second icon.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    displaying a tab bar for a selected record of a stored data object comprising a plurality of records, the selected record being related to a plurality of categories, the tab bar comprising a tab, and a plurality of dynamic tabs, wherein the tab links to a list of demoted categories of the plurality of categories related to the selected record, each demoted category including second records belonging to the demoted category, and each dynamic tab links to a promoted category of the plurality of categories;

monitoring usage of a demoted category, the usage of the demoted category comprising a first timestamp indicating when the demoted category was last accessed;

monitoring usage of each of the promoted categories, the usage of the promoted category comprising a second timestamp indicating when the promoted category was last accessed; and when the usage of the monitored demoted category is greater than the usage of any of the promoted categories:
  replacing the dynamic tab in the tab bar linking to the promoted category having a less usage than the monitored demoted category with another dynamic tab linking to the monitored demoted category, the monitored demoted category thereby being promoted to the tab bar; and
  replacing the monitored demoted category, on the list of demoted categories related to the selected record, with the promoted category having less usage than the monitored demoted category.

2. The method of claim 1 wherein the usage of the demoted category further comprises a number of times the demoted category was accessed during a rolling time period, and the usage of the promoted category comprises a number of times the promoted category was accessed during the rolling time period.

3. The method of claim 1 wherein the displaying the tab bar comprises displaying the tab bar on an electronic touchscreen of a portable electronic device.

4. A computer program product, comprising a non-transitory computer-readable medium having computer-readable program code embodied therein to be executed by one or more processors, the program code including instructions to:
  display a tab bar for a selected record of a stored data object comprising a plurality of records, the selected record being related to a plurality of categories, the tab bar comprising a tab, and a plurality of dynamic tabs, wherein the tab links to a list of demoted categories of the plurality of categories related to the selected record, each demoted category including second records belonging to the demoted category, and each dynamic tab links to a promoted category of the plurality of categories;
  monitor usage of a demoted category, the usage of the demoted category comprising a first timestamp indicating when the demoted category was last accessed;
  monitor usage of each of the promoted categories, the usage of the promoted category comprising a second timestamp indicating when the promoted category was last accessed; and
  when the usage of the monitored demoted category is greater than the usage of the any of the promoted categories:
    replace the dynamic tab in the tab bar linking to the promoted category having a less usage than the monitored demoted category with another dynamic tab linking to the monitored demoted category, the monitored demoted category thereby being promoted to the tab bar; and
    replace the monitored demoted category, on the list of demoted categories related to the selected record, with the promoted category having less usage than the monitored demoted category.

5. The computer program product of claim 4 wherein the usage of the demoted category further comprises a first value indicating a number of times the demoted category was accessed during a rolling time period, and
  the usage of the promoted category further comprises a second value indicating a number of times the promoted category was accessed during the rolling time period.

6. The computer program product of claim 4 wherein the displaying the tab bar comprises displaying the tab bar on an electronic touchscreen of a portable electronic device.

7. An apparatus comprising:
  a processor; and
  one or more stored sequences of instructions which, when executed by the processor, cause the processor to:
  store a primary record of a stored data object comprising a plurality of records;
  store a plurality of secondary records that are organized into a plurality of categories, each of the plurality of categories being associated with the primary record;
  collect first usage data of a first category that is linked to a first graphical interface;
  collect second usage data of a second category that is linked to a second graphical interface, the first graphical interface and the second graphical interface each being a portion of a third graphical interface;
  compare the first and second usage data by obtaining a first timestamp indicating when the first category was last accessed and obtaining a second timestamp indicating when the second category was last accessed; and
  when the comparison indicates the first category has a higher calculated relevance than the second category, swap the first category with the second category so that after the swap the second category is linked to the first graphical interface and the first category is linked to the second graphical interface, wherein the second graphical interface is at a level in a hierarchy that is below a level of the first graphical interface.

8. The apparatus of claim 7 wherein before the swapping, a number of user actions to access the second category is greater than a number of user actions to access the first category, and after the swapping, the number of user actions to access the second category is less than the number of user actions to access the first category.

9. The apparatus of claim 7 wherein comparing the first usage information and the second usage information further comprises:
  comparing a first value indicating a number of times the first category was accessed during a rolling time period with a second value indicating a number of times the second category was accessed during the rolling time period, wherein the first timestamp being more recent than the second timestamp indicates the first category is more relevant than the second category,
the second timestamp being more recent than the first timestamp indicates the second category is more relevant than the first category, the first value being greater than the second value indicates the first category is more relevant than the second category, and the second value being greater than the first value indicates the second category is more relevant than the first category.

10. A method for transmitting code comprising:
  transmitting, by a processor, code to display a tab bar for a selected record of a stored data object comprising a plurality of records, the selected record being related to a plurality of categories, the tab bar comprising a tab, and a plurality of dynamic tabs, wherein the tab links to a list of demoted categories of the plurality of categories related to the selected record, each demoted category including second records belonging to the demoted category, and each dynamic tab links to a promoted category of the plurality of categories;

transmitting, by a processor, code to monitor usage of a demoted category, the usage of the demoted category comprising a first timestamp indicating when the demoted category was last accessed;

transmitting, by a processor, code to monitor usage of a each of the promoted categories, the usage of the promoted category comprising a second timestamp indicating when the promoted category was last accessed; and transmitting, by a processor, code to if the usage of the demoted monitored demoted category is greater than the usage of any of the promoted categories:

replace the dynamic tab in the tab bar linking to the promoted category having a less usage than the monitored demoted category with another dynamic tab linking to the monitored demoted category, the monitored demoted category thereby being promoted to the tab bar; and replace the monitored demoted category, on the list of demoted categories related to the selected record, with the promoted category having less usage than the monitored demoted category.

11. The method of claim 10 wherein the usage of the demoted category comprises a first value indicating a number of times the demoted category was accessed during a rolling time period, and the usage of the promoted category comprises a second value indicating a number of times the promoted category was accessed during the rolling time period.

12. The method of claim 10 wherein the usage of the demoted category further comprises a first value indicating a number of times the demoted category was accessed during a rolling time period, and the usage of the promoted category further comprises a second value indicating a number of times the promoted category was accessed during the rolling time period.

13. The method of claim 10 wherein the transmitting code to display a tab bar comprises transmitting, by a processor, code to display the tab bar on an electronic touchscreen of a portable electronic device.

\* \* \* \* \*